United States Patent [19]

Uemachi et al.

[11] Patent Number: 5,370,947

[45] Date of Patent: Dec. 6, 1994

[54] REVERSIBLE ELECTRODE

[75] Inventors: Hiroshi Uemachi, Osaka; Yoshiko Sato, Neyagawa; Tadashi Sotomura, Kashiwara; Kenichi Takeyama, Osaka, all of Japan

[73] Assignee: Matsushita Electric Industrial Co., Ltd., Osaka, Japan

[21] Appl. No.: 56,052

[22] Filed: Apr. 30, 1993

[30] Foreign Application Priority Data

May 7, 1992 [JP] Japan ................................. 4-114514

[51] Int. Cl.$^5$ ............................................. H01M 4/02
[52] U.S. Cl. ..................... 429/213; 429/212; 564/17; 564/20; 564/23
[58] Field of Search ................... 429/212, 213; 564/17, 564/20, 23

[56] References Cited

U.S. PATENT DOCUMENTS

| | | | |
|---|---|---|---|
| 4,543,306 | 9/1985 | Dubois et al. | 429/194 |
| 4,655,885 | 4/1987 | Hill et al. | 204/72 |
| 4,879,192 | 11/1989 | Nishinura et al. | 429/198 |

FOREIGN PATENT DOCUMENTS

| | | |
|---|---|---|
| 0415856A2 | 3/1991 | European Pat. Off. . |
| 241978A1 | 1/1987 | Germany . |
| 242909A1 | 2/1987 | Germany . |
| 393169 | 4/1991 | Japan . |

OTHER PUBLICATIONS

K. Naoi et al, The 31st Battery Symposium in Japan, Nov. 1990, pp. 31–32 1A14, "Electrochemical Reaction of Organodisulfide Compounds: Application to Energy Storage Material".

*Primary Examiner*—Prince Willis, Jr.
*Assistant Examiner*—M. Nuzzolillo
*Attorney, Agent, or Firm*—Renner, Otto, Boisselle & Sklar

[57] ABSTRACT

A reversible electrode of the present invention includes, as a main component thereof, a thiourea compound represented by the following formula (I):

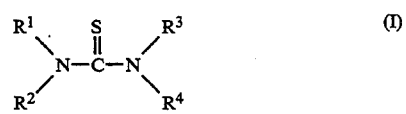

(where $R^1$, $R^2$, $R^3$, and $R^4$ are independently selected from the group consisting of hydrogen, halogen, a hydroxyl group, a cyano group, a carboxyl group, an amino group, an aryl group, an allyl group, an alkyl group, an alkoxy group, a group containing a mercapto group, a group containing a phenyl group, a group having a hetero ring containing O, and a group having a hetero ring containing N) or a polymer having the thiourea compound as its main polymer unit; the reversible electrode utilizing reversible electrochemical oxidation-reduction of sulfur atoms of the thiourea compound or the polymer.

20 Claims, 1 Drawing Sheet

A —— EXAMPLE 1

B ---- EXAMPLE 2

C —·— COMPARATIVE EXAMPLE

REVERSIBLE ELECTRODE

BACKGROUND OF THE INVENTION

1. Field of the Invention

The present invention relates to a reversible electrode used for electrochemical devices such as a battery, an electrochromic display, a sensor, and a memory.

2. Description of the Related Art

An electrode material used for a lightweight battery with a high energy density, an electrochromic display with a large area, or a biochemical sensor using a microelectrode is required to be lightweight, to have a high theoretical energy density, and to be excellent in durability.

A conducting polymer electrode has extensively been studied since Shirakawa et al. discovered conducting polyacetylene in 1971. This is because the use of a conducting polymer enables a battery which is lightweight and has a high energy density. Polyacetylene is, however, impractical in use due to its chemical instability with respect to moisture and oxygen in the air. Subsequently, since n-electron conjugated conducting polymers, which are chemically stable, such as polyaniline, polypyrrol, and polythiophene were discovered, a lithium secondary battery and the like using these electrode materials as a cathode have been developed. In addition to these conducting polymers, some electrode materials which are lightweight and have a high energy density, such as sulfur and a compound containing sulfur have been studied.

An electrode using a conducting polymer as a cathode incorporates anions in an electrolyte as well as cations when subjected to an electrode reaction. Thus, the electrolyte acts as a medium for moving ions and participates in the cell reaction simultaneously as a cathode active material. Because of this, as the electrode reaction proceeds, the electrolyte decreases in amount, requiring that an electrolyte in an amount enough to compensate for a battery's capacity should be supplied in a battery. As a result, an energy density of the battery is decreased. A lithium secondary battery using a conducting polymer as a cathode has an energy density of 20 to 50 Wh/kg, i.e., about ½ of that of a usual secondary battery such as a nickel-cadmium battery or a lead storage battery. Moreover, for example, a sodium-sulfur battery using sulfur as a cathode is slow to perform an electrode reaction at room temperature, so that this type of battery is used only under a high temperature condition where the electrode reaction proceeds relatively rapidly. Japanese Laid-Open Patent Publication No. 3-93169 discloses a solid electrochemical battery which recharges itself, using an organic sulfur compound such as dithiouracil as a cathode. This solid electrochemical battery does not have a sufficiently high electrode reaction rate at room temperature.

SUMMARY OF THE INVENTION

The reversible electrode of this invention, includes, as a main component thereof, a thiourea compound represented by the following formula (I):

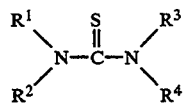
(I)

(where $R^1$, $R^2$, $R^3$, and $R^4$ are independently selected from the group consisting of hydrogen, halogen, a hydroxyl group, a cyano group, a carboxyl group, an amino group, an aryl group, an allyl group, an alkyl group, an alkoxy group, a group containing a mercapto group, a group containing a phenyl group, a group having a hetero ring containing O, and a group having a hetero ring containing N) or a polymer having the thiourea compound as its main polymer unit; the reversible electrode utilizing reversible electrochemical oxidation-reduction of sulfur atoms of the thiourea compound or the polymer as an electrode reaction of the electrode.

Thus, the invention described herein makes possible the advantage of providing a reversible electrode which has a sufficiently high electrode reaction rate at room temperature and is lightweight and has a high theoretical energy density.

This and other advantages of the present invention will become apparent to those skilled in the art upon reading and understanding the following detailed description with reference to the accompanying figures.

DESCRIPTION OF THE PREFERRED EMBODIMENTS

Figure 1:
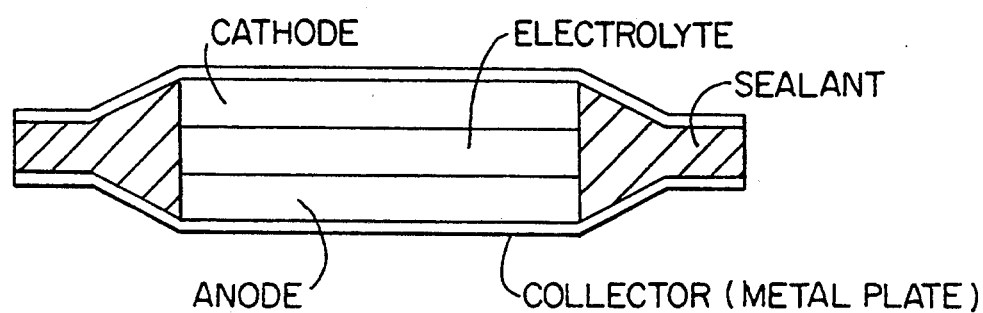
FIG. 1 is a cross-sectional view of a battery using a reversible electrode as an Example of the present invention or of a Comparative Example.

The reversible electrode of the present invention includes the thiourea compound represented by the following formula (I):

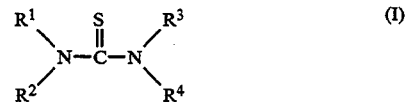
(I)

(where $R^1$, $R^2$, $R^3$, and $R^4$ are independently selected from the group consisting of hydrogen, halogen, a hydroxyl group, a cyano group, a carboxyl group, an amino group, an aryl group, an allyl group, an alkyl group, an alkoxy group, a group containing a mercapto group, a group containing a phenyl group, a group having a hetero ring containing O, and a group having a hetero ring containing N) or a polymer having the thiourea compound as its main polymer unit; the reversible electrode utilizing reversible electrochemical oxidation-reduction of sulfur atoms of the thiourea compound or the polymer as an electrode reaction of the electrode.

Examples of the halogen include chloride, bromide, and iodine. Examples of the aryl group include a phenyl group, a tolyl group, an xylyl group, and a naphthyl group. Examples of the alkyl group include a methyl group and an ethyl group. Examples of the alkoxy group include a methoxy group and an ethoxy group. Examples of the group containing a mercapto group include a methylthiol group and an ethylthiol group. Examples of the group having a hetero ring containing O include a furyl group. Examples of the group having a hetero ring containing N include a pyridyl group.

Examples of the thiourea compound preferably include 1,3-dimethylthiourea, 1,1,3,3-tetramethyl-2-thiourea, 1,3-diphenyl-thiourea, 4-methyl-3-thiosemicarbazide, 1,3-di-para-tolyl-2-thiourea, and 2-imidazolidinethione. The polymer having the thiourea compound as its main polymer unit is represented by the following formula (II):

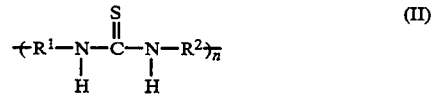 (II)

where $R^1$ and $R^2$ are independently selected from the group consisting of an aliphatic group and an aromatic group. n is an integer ($n \geq 1$). Examples of $R^1$ and $R^2$ preferably include a methylene group and a phenylene group. A typical example of the polymer having the thiourea compound as its main polymer unit is polythiourea, etc.

Since the thiourea compound does not have any electronic conductivity, an electrode is formed by the combination of the thiourea compound and an electron conducting material. Examples of the electron conducting material include various kinds of metallic materials and semiconductor materials; electron conducting materials of oxides and sulfides; carbon or graphite materials; and conducting polymers. Examples of the conducting polymers include polyaniline, polypyrrol, polyacetylene, and polythiophene. These materials can be used in the form of a particle, a fiber, a fibril, a whisker, etc. In particular, a minute fibril shape or a whisker shape is preferred. The thiourea compound and the conducting material can be mixed in an arbitrary ratio depending upon a purpose. The thiourea compound and the conducting material are preferably mixed in a weight ratio in the range of 90:10 to 10:90.

Moreover, if required, a polymer electrolyte material is added to the thiourea compound and the electron conducting material, and the mixture thus obtained is formed into a predetermined shape, e.g., a film shape, whereby an electrode can be formed. Alternatively, the electron conducting material and the polymer electrolyte material are previously formed into a porous film, and the thiourea compound is carried on this porous film, whereby an electrode can be formed. Furthermore, in the case where the conducting polymer is used as an electron conducting material, the thiourea compound is added during the preparation of the conducting polymer from a monomer by polymerization, and the polymer thus obtained is used for forming an electrode.

The polymer having the thiourea compound as its main polymer unit has similar characteristics to the thiourea compound, so that an electrode comprising the polymer having the thiourea compound as its main polymer unit can be formed similarly, and the electrode comprising the polymer has substantially the same characteristics as those of electrodes comprising the thiourea compound.

The electrode thus obtained is combined with an anode made of, for example, lithium to form a secondary battery.

The thiourea compound has the following characteristics:

A sulfur atom contained in one molecule of the thiourea compound is electrochemically oxidized to form a disulfide bond with a sulfur atom contained in another molecule of the compound, thereby forming a dimer. A sulfur atom contained in one molecule of a polymer having the thiourea compound as its main polymer unit is electrochemically oxidized to form a disulfide bond with another sulfur atom contained in the polymer molecule; alternatively, a sulfur atom contained in one molecule of the polymer is electrochemically oxidized to form a disulfide bond with a sulfur atom in another molecule of the polymer, thereby forming a multimer of the polymer. The dimer, the polymer or the multimer thus formed returns to the original compound when those are electrochemically reduced. When a sulfur atom is under a reduced condition, the thiourea bond has a resonating structure as shown in the following formula (III), so that a negative charge on the sulfur atom is not localized. As a result, the electrochemical oxidation-reduction of the sulfur atom is accelerated, whereby a reversible electrode which has a sufficiently high electrode reaction rate at room temperature can be provided. Moreover, the thiourea compound has a high theoretical energy density because of utilizing reversible oxidation-reduction of sulfur atoms. A sulfur atom has a large theoretical energy density of 2,600 Wh/kg.

The polymer having the thiourea compound as its main polymer unit has similar characteristics to the thiourea compound.

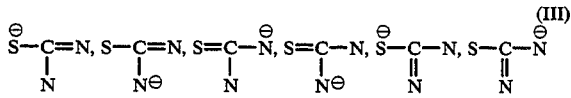 (III)

EXAMPLES

Hereinafter, the present invention will be described by way of illustrating examples with reference to the drawings.

Example 1

Formation of a composite electrode of 1,3-dimethylthiourea and polyaniline

First, 3.9 g of $LiCF_3SO_3$, 11.5 g of sulfolane, and 7.9 g of ethylene carbonate were mixed. Then, 3.0 g of acrylonitrile/methylacrylonitrile copolymer powders (manufactured by Toyobo Co., Ltd.) were dissolved in the thus obtained solution. To the resulting solution, 5 g of acrylonitrile was added to obtain a gel electrolyte solution. The gel electrolyte solution was casted onto a glass plate and dried in vacuo at 60° C. for 2 hours to obtain a gel electrolyte film (SPE) with a thickness of 100 μm and an ion conductivity of $6 \times 10^{-4}$ S/cm.

Separately, the above-mentioned gel electrolyte solution, polyaniline (PAn) powders, and 1,3-dimethylthiourea (manufactured by Kanto Chemical Co., Ltd.) were mixed in a weight ratio of 64:7:29 and stirred to obtain 1,3-dimethylthiourea composite electrode solution. The electrode solution thus obtained was casted onto a glass plate and dried in vacuo at 60° C. for 2 hours to obtain a composite cathode film with a thickness of 170 μm.

The above-mentioned gel electrolyte film (SPE) and the composite cathode film were cut into a circular shape with a diameter of 13 mm. The gel electrolyte film was sandwiched between the cathode film and an anode film. Here, as the anode film, a metallic lithium film with a diameter of 13 mm and a thickness of 70 μm was used. The electrolyte film sandwiched between the cathode film and the anode film was placed in a container made of a metal plate as shown in FIG. 1, and sealed with a sealant to obtain a test battery A.

The test battery A was subject to a constant voltage charging at 4.05 V until the charging current density decreases below 50 $\mu A/cm^2$. It was then discharged down to 1.5 V at a constant current density of 50 $\mu A/cm^2$. The weight energy density of the test battery A was calculated at 240 Wh/kg per 1 kg of cathode.

Example 2

Synthesis of Polythiourea

First, 1.4 g of m-phenylenediamine was added to 80 ml of dehydrated benzene. The mixture was heated to 50° C. so that the m-phenylenediamine was dissolved in the dehydrated benzene. The solution thus obtained was kept at 50° C. To this solution, a solution in which 2.4 g of phenylene-1,4-diisothiocyanate was dissolved in 40 ml of dehydrated benzene was gradually combined drop by drop so as to mix both of the solutions. After that, the mixed solution was refluxed for one hour to obtain a polythiourea solution. The resulting solution was filtered by suction, and a light brown solid material remaining on a filter paper was dried in vacuo to obtain 3.1 g of polythiourea.

Formation of a Composite Electrode of Polythiourea and Carbon

A gel electrolyte film (SPE) was obtained by the same method as that in Example 1. A gel electrolyte lyre solution which was the same as that obtained in Example 1, carbon powders, and polythiourea were mixed in a weight ratio of 64:7:29, and stirred to obtain a polythiourea composite electrode solution. This electrode solution was casted onto a glass plate and dried in vacuo at 60° C. for 2 hours to obtain a composite cathode film with a thickness of 170 $\mu$m.

The above-mentioned gel electrolyte film (SPE) and the composite cathode film were cut into a circular shape with a diameter of 13 mm. Then, the gel electrolyte film was sandwiched between the cathode film and an anode film. Here, as the anode film, a metallic lithium film with a diameter of 13 mm and a thickness of 70 $\mu$m was used. The electrolyte film sandwiched between the cathode film and the anode film was placed in a container made of a metal plate as shown in FIG. 1, and sealed with a sealant to obtain a test battery B.

The test battery B was subject to the constant voltage charging at 4.05 V until the charging current density decreases below 50 $\mu A/cm^2$. It was then discharged down to 1.5 V at the constant current density of 50 $\mu A/cm^2$. The weight energy density of the test battery B was calculated at 180 Wh/kg per 1 k/g of cathode.

Comparative Example

A battery containing polyaniline was formed in the same manner as that in Example 1 as follows:

A gel electrolyte film (SPE) was obtained by the same method as that in Example 1. A gel electrolyte solution which was the same as that obtained in Example 1 and polyaniline (PAn) powders were mixed in a weight ratio of 64:36 and stirred to obtain a composite electrode solution. The solution thus obtained was casted onto a glass plate and dried in vacuo at 60° C. for 2 hours to obtain a composite cathode film with a thickness of 170 $\mu$m.

The gel electrolyte film (SPE) and the composite cathode film were cut into a circular shape with a diameter of 13 mm. Then, the gel electrolyte film was sandwiched between the cathode film and an anode film. Here, as the anode film, a metallic lithium film with a diameter of 13 mm and a thickness of 70 $\mu$m was used. The electrolyte film sandwiched between the cathode film and the anode film was placed in a container made of a metal plate and sealed with a sealant to obtain a comparative battery C.

The test battery C was subject to the constant voltage charging at 4.05 V until the charging current density decreases below 50 $\mu A/cm^2$. It was then discharged down to 1.5 V at the constant current density of 50 $\mu A/cm^2$. The weight energy density of the test battery C was calculated at 140 Wh/kg per 1 kg of cathode. This revealed that the weight energy density of the test battery C was about 3/5 of that of the test battery A in Example 1.

Figure 2:
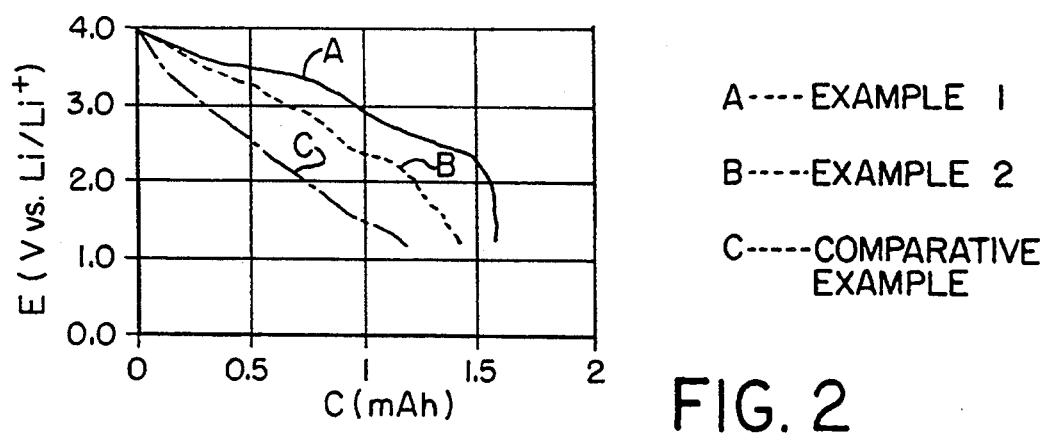
FIG. 2 is a graph showing capacity-voltage characteristics of batteries using reversible electrodes of Examples of the present invention and a Comparative Example.

FIG. 2 shows discharging curves of the batteries A, B and C. The horizontal axis represents a battery capacity and the vertical axis represents a battery voltage. It is understood from FIG. 2 that the battery formed using a thiourea compound electrode had a high capacity.

As described above, a secondary battery which has a high oxidation-reduction reaction rate, a high energy density, and a long life can be provided by using the reversible electrode of the present invention as a cathode and metallic lithium or the like as an anode.

In addition, an electrode used for electro-chemical devices such as an electrochromic display with a large area and a biochemical sensor using a microelectrode, which is lightweight while having a high theoretical energy density and is excellent in durability, can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reversible electrode comprising:
   a thiourea compound represented by the following formula (I):

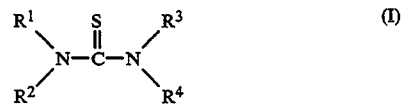

(where $R^1$, $R^2$, $R^3$, and $R^4$ are independently selected from the group consisting of hydrogen, halogen, a hydroxyl group, a cyano group, a carboxyl group, an aryl group, an allyl group, an alkyl group, an alkoxy group, a group containing a mercapto group, a group containing a phenyl group, and a group having a hetero ring containing O), or a polymer having the thiourea compound as its main polymer unit; the reversible electrode utilizing reversible electrochemical oxidation-reduction of sulfur atoms of the thiourea compound or the polymer; and
   an electron conducting material.

2. A reversible electrode according to claim 1, wherein a molecule of the thiourea compound is capable of forming a disulfide bond together with another molecule of the compound when subjected to electrochemical oxidation.

3. A reversible electrode according to claim 1, wherein the thiourea compound or the polymer having the thiourea compound as its main polymer unit is selected from the group consisting of 1,3-dithiomethylurea, 1,1,3,3-tetramethyl-2-thiourea, 1,3-diphenyl-thiourea, 4-methyl-3-thiosemicarbazide, 1,3 -di-para-tolyl-2-thiourea, 2-imidazolidinethione, and polythiourea.

4. A reversible electrode according to claim 1, wherein the electron conducting material is a conducting polymer.

5. A reversible electrode according to claim 4, wherein the conducting polymer is selected from the group consisting of polyaniline, polypyrrol, polyacetylene, and polythiophene.

6. A reversible electrode according to claim 1, wherein $R^1$, $R^2$, $R^3$, and $R^4$ are independently selected from the group consisting of hydrogen, an aryl group and an alkyl group.

7. A reversible electrode according to claim 1, wherein the thiourea compound or the polymer having the thiourea compound as its main polymer unit is selected from the group consisting of 1,3-dithiomethylurea and polythiourea.

8. A reversible electrode comprising: a thiourea compound represented by the following formula (I):

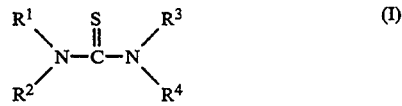

wherein $R^1$, $R^2$, $R^3$, and $R^4$ are independently selected from the group consisting of hydrogen, halogen, a hydroxyl group, a cyano group, a carboxyl group, an aryl group, an allyl group, an alkyl group, an alkoxy group, a group containing a mercapto group, a group containing a phenyl group, and a group having a hetero ring containing O; the reversible electrode utilizing reversible electrochemical oxidation-reduction of sulfur atoms of the thiourea compound; and an electron conducting material.

9. A reversible electrode according to claim 8, wherein a molecule of the thiourea compound is capable of forming a disulfide bond together with another molecule of the compound when subjected to electrochemical oxidation.

10. A reversible electrode according to claim 8, wherein the thiourea compound is selected from the group consisting of 1,3-dithiomethylurea, 1,1,3,3-tetramethyl-2thiourea, 1,3-diphenyl-thiourea, 4-methyl-3-thiosemicarbazide, 1,3-di-para-tolyl-2-thiourea, and 2-imidazolidinethione.

11. A reversible electrode according to claim 8, wherein the electron conducting material is a conducting polymer.

12. A reversible electrode according to claim 11, wherein the conducting polymer is selected from the group consisting of polyaniline, polypyrrol, polyacetylene, and polythiophene.

13. A reversible electrode according to claim 8, wherein $R^1$, $R^2$, $R^3$, and $R^4$ are independently selected from the group consisting of hydrogen, an aryl group and an alkyl group.

14. A reversible electrode comprising: a polymer having as a main polymer unit a thiourea compound represented by the following formula (I):

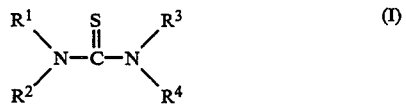

wherein $R^1$, $R^2$, $R^3$, and $R^4$ are independently selected from the group consisting of hydrogen, halogen, a hydroxyl group, a cyano group, a carboxyl group, an aryl group, an allyl group, an alkyl group, an alkoxy group, a group containing a mercapto group, a group containing a phenyl group, and a group having a hetero ring containing O; the reversible electrode utilizing reversible electrochemical oxidation-reduction of sulfur atoms of the polymer; and an electron conducting material.

15. A reversible electrode according to claim 14, wherein a unit of the polymer having a thiourea compound is capable of forming a disulfide bond together with another unit of the polymer having a thiourea compound when subjected to electrochemical oxidation.

16. A reversible electrode according to claim 14, wherein the polymer having the thiourea compound as its main polymer unit is selected from the group consisting of 1,3 -dithiomethylurea, 1,1,3,3 -tetramethyl-2-thiourea, 1,3 -diphenyl-thiourea, 4-methyl-3-thiosemicarbazide, 1,3-di-para-tolyl-2-thiourea, 2-imidazolidinethione, and polythiourea.

17. A reversible electrode according to claim 14, wherein the electron conducting material is a conduction polymer.

18. A reversible electrode according to claim 17, wherein the conducting polymer is selected from the group consisting of polyaniline, polypyrrol, polyacetylene, and polythiophene.

19. A reversible electrode according to claim 14 wherein $R^1$, $R^2$, $R^3$, and $R^4$ are independently selected from the group consisting of hydrogen, an aryl group and an alkyl group.

20. A reversible electrode according to claim 1, wherein the polymer having the thiourea compound as its main polymer unit is selected from the group consisting of 1,3-dithiomethylurea and polythiourea.

* * * * *